United States Patent
Shortridge, Sr.

(10) Patent No.: US 10,132,353 B1
(45) Date of Patent: Nov. 20, 2018

(54) HYDRAULIC TURBINE SHAFT THRUST BEARING WEAR PAD

(71) Applicant: Robert Alan Shortridge, Sr., Powhatan, VA (US)

(72) Inventor: Robert Alan Shortridge, Sr., Powhatan, VA (US)

(*) Notice: Subject to any disclaimer, the term of this patent is extended or adjusted under 35 U.S.C. 154(b) by 0 days.

(21) Appl. No.: 15/595,986

(22) Filed: May 16, 2017

(51) Int. Cl.
   *F16C 17/04* (2006.01)
   *F16C 33/18* (2006.01)
   *F16C 33/10* (2006.01)
   *F03B 11/06* (2006.01)

(52) U.S. Cl.
   CPC .......... *F16C 33/108* (2013.01); *F03B 11/063* (2013.01); *F16C 17/04* (2013.01); *F05B 2220/32* (2013.01); *F05B 2240/52* (2013.01); *F05B 2240/60* (2013.01); *F05B 2280/4002* (2013.01); *F16C 2360/23* (2013.01)

(58) Field of Classification Search
   CPC ...... F16C 17/04; F16C 17/065; F16C 33/108; F16C 33/18; F16C 2360/23; F03B 11/063; F05B 2220/32; F05B 2240/52; F05B 2280/4002
   See application file for complete search history.

(56) References Cited

U.S. PATENT DOCUMENTS

| | | | | |
|---|---|---|---|---|
| 1,498,578 A | * | 6/1924 | Romano | F16C 17/04 384/427 |
| 1,946,790 A | * | 2/1934 | Haas | F16C 33/18 106/36 |
| 2,137,138 A | * | 11/1938 | Graef | F16C 33/046 384/263 |
| 2008/0253706 A1 | * | 10/2008 | Bischof | F16C 17/035 384/117 |
| 2015/0300403 A1 | * | 10/2015 | Gonzalez | F16C 17/04 384/420 |
| 2016/0047416 A1 | * | 2/2016 | Shortridge, Sr. | F16C 33/18 384/297 |

* cited by examiner

*Primary Examiner* — Phillip A Johnson

(74) *Attorney, Agent, or Firm* — John H. Thomas, P.C.

(57) ABSTRACT

A thrust bearing wear pad includes a rigid support plate adapted to be mounted on a collar and under a thrust flange in a hydro power turbine system. Multiple lignum vitae wood blocks are fixed to the top of the support plate and act as a wear surface on the wear pad.

11 Claims, 4 Drawing Sheets

HYDRAULIC TURBINE SHAFT THRUST BEARING WEAR PAD

The field of the invention is thrust bearing wear pads. Specifically, the thrust bearing wear pads that are used in connection with hydraulic turbine shafts must withstand significant stresses. The present thrust bearing wear pad includes lignum vitae wood blocks that make up the surface of bearing wear pads.

BACKGROUND

Large hydraulic turbine shafts include a thrust flange that is carried on and must rotate around on a supporting collar having thrust bearings positioned on the supporting collar and that carry most or all of the weight of the turbine shaft. The wear surface on a thrust bearing is subject to large stresses under extreme conditions. This thrust flange rotates on the surface of a thrust bearing wear pad. Conventionally, a wear surface on the thrust bearing wear pad is coated with a lubricant that separates the thrust bearing wear pad from the flange surface of the shaft. However, even minor impurities or foreign material that may accidentally mix into the lubricant can create significant damage on the face of the thrust bearing wear pad and cause it to wear unevenly. The unevenness in wearing can create significant problems overall in the operation of the shaft over time. Other duty conditions including heat and vibration can also have a detrimental effect on the smooth surface of a wear pad.

Thrust bearing wear pads have historically been formed of monolithic materials. A hundred years ago, these pads included single, solid wood pads. More recently, sophisticated polymers and composites have been deployed as the wear pads. These polymer and composite materials, however, have been found to be not sufficiently durable. Furthermore, the older single-piece solid wood pads that have been relatively successful in operation are increasingly difficult and expensive to source.

SUMMARY

Accordingly, it is an object of the present invention to overcome the foregoing drawbacks and provide a durable thrust bearing wear pad. In one example, the thrust bearing wear pad includes a rigid support plate adapted to be mounted on a collar and under a thrust flange. A plurality of lignum vitae blocks are fixed to the support plate and form a wear pad surface thereon. The thickness of the lignum vitae blocks may be at least about one inch. The lignum vitae blocks may be configured adjacent to each other and are each bonded onto a carbon fiber mat that is itself bonded to the support plate. Each lignum vitae block may have at least one hole drilled into and across an entire width of the block and within the thickness of the block. A fiber thread clamp may be extended through the hole. The length of the thread is sufficient that opposite ends of the fiber thread extend out of each side of the lignum vitae block and down to the carbon fiber mat and that are bonded to the mat.

The carbon fiber mat may be bonded to the lignum vitae blocks with epoxy, and the fiber thread ends are bonded to the fiber mat with epoxy. The lignum vitae blocks comprise a top side that forms the wear pad surface, and a bottom side that is bonded to the carbon fiber mat and thereby to the support plate. The lignum vitae blocks further comprise vertical holes therein that are open on the bottom side and that extend into the thickness of the blocks, wherein the epoxy fills in the vertical holes to reinforce the bond of the lignum vitae blocks to the carbon fiber mat. The vertical holes may extend up to about half of the thickness of the lignum vitae blocks.

The lignum vitae blocks may also have side walls that extend from the top and the bottom side, and top edges that define the intersection of the side walls and the top side, and wherein the top edges are chamfered to reduce edge loading. The lignum vitae blocks may comprise heart sections of lignum vitae wood. The wear pad may further comprise water ports open to the wear pad surface to enable the flow of water or lubricant across the surface. The lignum vitae blocks may be arranged so that the wear pad surface is substantially perpendicular, or alternatively parallel, to the natural grain of the lignum vitae blocks.

DETAILED DESCRIPTION

Figure 1:
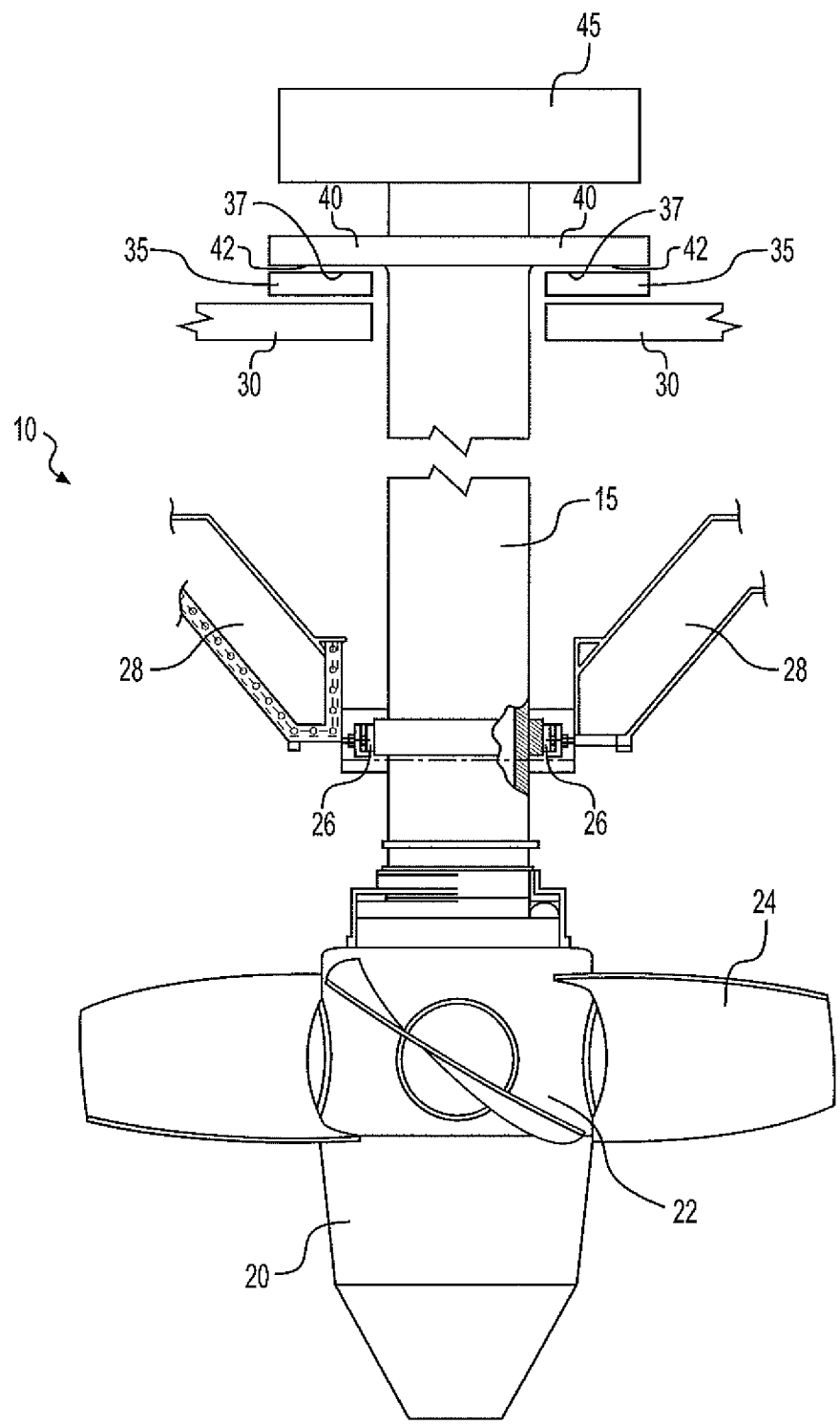
FIG. 1 is a side view of a hydraulic turbine/shaft system generally.

FIG. 1 illustrates in a general way a hydraulic power generation propeller and shaft system 10. Beginning at the bottom of the system 10, there is seen a propeller 20, a hub 22 and blades 24 connected to the hub and propeller body. The propeller 20 is attached to the main shaft 15. There are many types and styles propellers that are and can be employed in various hydraulic systems, the propeller 20/hub 22/blades 24 example shown is representative of any propeller mounted on a rotating shaft.

The shaft 15 is connected on one end to the propeller 20 and on its opposite end to a generator device 45 at the top of the shaft. A main shaft bearing 26 is mounted on a fixed support structure 28. The main shaft bearing 26 engages the shaft 15 and secures it so that the rotation of the shaft is true without vibration, or at least with minimal vibration.

Closer to the top of the shaft 15 is a thrust flange 40 that is a load-bearing flange that securely carries the weight of the shaft 15. The thrust flange is supported on a fixed structural collar 30. More specifically, the bottom side 42 of the thrust flange 40 is carried on a support thrust flange bearing 35 having a top wear surface 37. The focus of the present disclosure is the thrust flange bearing 35, and specifically the top surface 37 of the bearing 35 and how it may effectively and durably carry the weight that presses on it from the bottom side 42 of the thrust flange 40.

In order to stand up to the huge weight and stress of carrying a hydropower turbine shaft and propeller, the wear pad on a thrust bearing includes a set of multiple lignum vitae blocks that form the wear pad surface on each of the wear pads in a system. An array of lignum vitae blocks is bonded to each other and to a backing plate to form each thrust bearing wear pad. This composite wear pad and thrust bearing is mounted on a thrust collar around the turbine shaft and under its thrust flange to carry the weight of and facilitate the rotation of the shaft in use.

Figure 2:
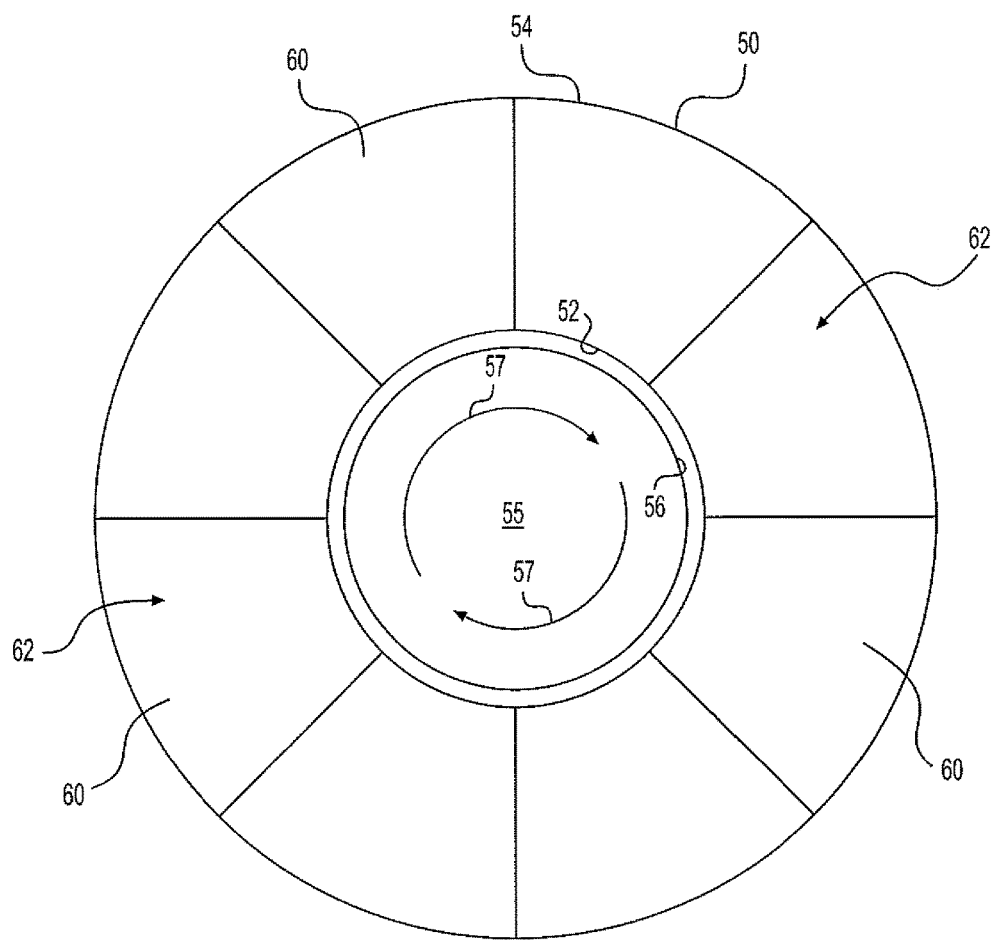
FIG. 2 is a top view of thrust flange bearing support pads mounted around a shaft.

In one example, FIG. 2 illustrates a thrust bearing 50 having eight thrust bearing wear pads 60. The wear surfaces 62 of the wear pads 60 are the portions of those pads that bear against the bottom side of a thrust flange. The thrust bearing 50 has an inside diameter 52 that is slightly larger than the outside diameter 56 of the shaft 55. As shown, the shaft 55 is rotating in the clockwise direction 57. The outside diameter 54 of the thrust bearing 50 will be similar in dimension—about the same as or a little more or less, than the outside diameter of the bottom side of the thrust flange.

The wear surface of each wear support pad incorporates the surface of multiple blocks of lignum vitae wood. The use of multiple blocks means that the thrust flange load is diversified and spread over the multiple lignum vitae blocks. Strategically, this diversification of the load means that if any single block of lignum vitae was flawed or otherwise unforeseeably, relatively weak, then the other blocks could disperse the weight and carry the load from the thrust flange.

The grain of the individual lignum vitae blocks may also be selected to purpose. For instance, the plane of the wear surface of each block may be substantially end-grain, or alternatively long-grain (and parallel or perpendicular to the direction of movement of the thrust flange over the wear surface), or still further alternatively predetermined or random wood grain angles in between substantially pure end-grain or long-grain orientations. In the substantially end-grain example, the grain of the lignum vitae wood is substantially perpendicular to the plane of the wear pad surface. In the long-grain examples, the grain of the lignum vitae wood block is substantially parallel to the plane of the wear pad surface. Moreover, each lignum vitae block orientation with respect to wear surface may be varied depending on the specific section of the wear pad where the block is secured. Or, the grain orientation of each lignum vitae wood block may be random in order to impart a diversified grain benefit to each overall wear pad surface. Finally, different wear pads deployed around the turbine shaft and under the thrust flange may be intentionally different with respect to the grain exposed on the individual lignum blocks that make up each wear pad. The term "substantially" is used to describe end-grain and long-grain examples of the direction of the wood grain in the blocks, because the natural wood grain may vary slightly and not have a perfectly straight direction.

Figure 5:
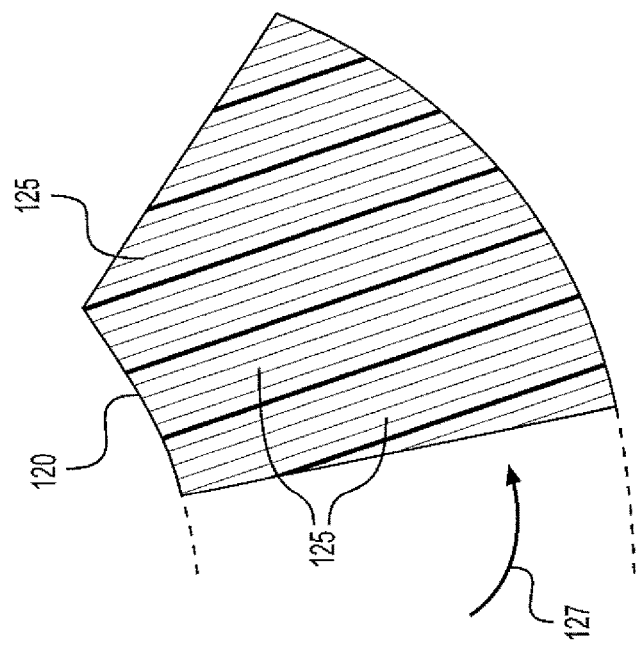
FIG. 5 is a top view of a support pad having side grain orientation of the lignum vitae blocks configured with the grain substantially parallel to the plane of the wear pad surface and in the substantially perpendicular orientation with respect to the direction of rotation of the thrust flange over the wear pad.
Figure 4:
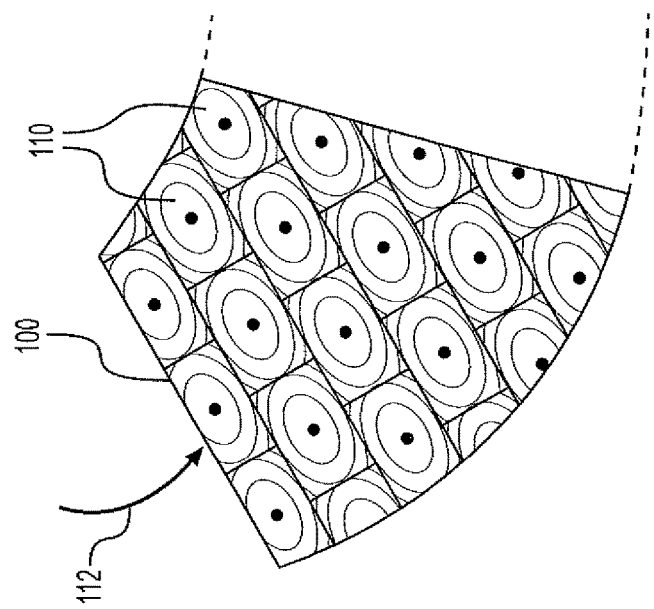
FIG. 4 is a top view of a support pad having end-grain, heart sections of lignum vitae wood blocks with the wood block grain being substantially perpendicular to the plane of the wear pad surface.

See for example FIGS. 4 and 5 to help understand the direction of the wood grain in the lignum vitae blocks. In FIG. 4, a wear pad section 100 is formed of multiple blocks 110 of end-grain, heart sections of lignum vitae wood. Arrow 112 illustrates the direction of rotation of a thrust flange over the surface of this wear pad 100. Similarly, in FIG. 5, a wear pad section 120 is formed of relatively longer (as compared with blocks 110 in FIG. 4), rectangular blocks 125 of long-grain, lignum vitae wood. As shown, the long-grain blocks 125 are substantially perpendicular to the direction of rotation arrow 127 of a thrust flange over the pad 120.

The thrust bearing wear pads are positioned on a thrust collar and mounted around the circumference of the turbine shaft and under the bottom side of the thrust flange portion of the main shaft. The number of wear pads that make up the complete thrust bearing wear surface may be anywhere from approximately 2 to 20 different pads, or alternatively about 6 to 16 pads or still further alternatively about 8 to 12 pads.

Eight wear pads 60 are illustrated on the thrust bearing 50 in FIG. 2. Typically, these individual wear pads are uniform in size at a given installation. However, the wear pads may be larger and/or smaller as disposed around the circumference of the shaft. For the sake of substantially equal weight bearing purposes, the wear pads are typically uniform. These wear pads are visually the pie slices around the circumference of the shaft.

The wear pads may be fixed installations rigidly attached to the thrust collar on which the thrust flange is carried. Alternatively, the wear pads may be mounted or deployed on a tilted pad system as engineered by, for instance, Kingsbury.

Each of the wear pads described herein includes a top wear surface, see for instance wear surface 62 of wear pads 60 in FIG. 2. This top wear surface is made up of the top surface of multiple blocks that are fixed onto the surface of an underlying support plate. The blocks are blocks of lignum vitae wood. The number of blocks that may be incorporated onto each wear pad is variable depending on the size of the wear pad and the size of the lignum vitae wood blocks. The number of blocks incorporated onto each wear pad may be 2 to 50, or alternatively 3 to 30, or still further alternatively 4 to 20 separate blocks, or stated another way, there may be 2 or more blocks for each wear pad, or alternatively 3 or more, or still further alternatively 4 or more.

The wear surface shape of each lignum vitae block that is fixed onto each wear pad can be uniform or different across the surface of the wear pad. The blocks may be generally square, rectangular, trapezoidal, or otherwise irregular. The edges of the blocks may be straight or curved. In one example, for instance in FIGS. 4 and 5, the blocks cover the full surface of the wear pad. Alternatively, however, the blocks may be fixed to the wear pad to create intentional gaps between those blocks.

Each wear pad includes a support plate that is substantially the shape of the wear pad. This support plate is a rigid substrate. For instance, the support plate may be fabricated from a single monolithic piece of steel or aluminum or other rigid metallic material. This support plate may be a layered metallic plate. The plate will be approximately 1 to 6 inches in thickness, or alternatively described as height, or alternatively about 2 to 4 inches in thickness.

A combined array of wear pads mounted onto a support plate will form an annular ring around a turbine shaft. Each wear pad is substantially flat on its top and bottom surfaces. While the rigid material that forms the support plate that carries the wear pads is most likely a steel composition, other rigid materials such as alternative metals, polymers, ceramics or composites thereof could be used as long as they can withstand the stress conditions of the support plate position. The inside diameter of the assembled wear pads is large enough to encircle and fit around the outside diameter of the turning shaft. The inside diameter may be very close in size to the outside diameter of the shaft, or there may be an intentional gap left between the shaft and the inside diameter. The outside diameter of the support pad is substantially equal to or less than the outside diameter of the bottom side of the thrust flange portion of the turbine shaft. The support plate may be flat or may be fixed to a tilt pad that is mounted underneath the support plate. If fixed to a tilt pad, the support plate rests at the same slight angle to flat as the tilt pad. Flat is defined as perpendicular to the central axis of the rotation of the turbine shaft. The support plate includes valves and apertures therein that facilitate the water flow and access of the water to the top surface water ports in the wear pad so that the water can lubricate the surface of the wear pads in use.

Wear pad sections are fixed to the support plate by way of a carbon fiber mat. The carbon fiber mat is made of woven and/or nonwoven carbon fibers. The mat is very thin, but is nevertheless very strong because of its carbon fiber composition. Other materials may be used to form the fiber mat onto which the wear pad sections are fixed. It is only necessary that the fiber mat be made of thin and durable materials. The fiber mat is secured to the support pad by being impregnated with an epoxy and bonded to the top surface of that support plate.

Importantly, the fiber mat is the substrate that has lignum vitae wood blocks bonded to it. The lignum vitae blocks are bonded directly by way of an epoxy adhesive or other adhesive on the bottom surface of the lignum vitae blocks that are carried on the mat. In addition to this bottom surface bonding to the mat, other elements are used to secure each block and the array of blocks to the mat.

Figure 3:
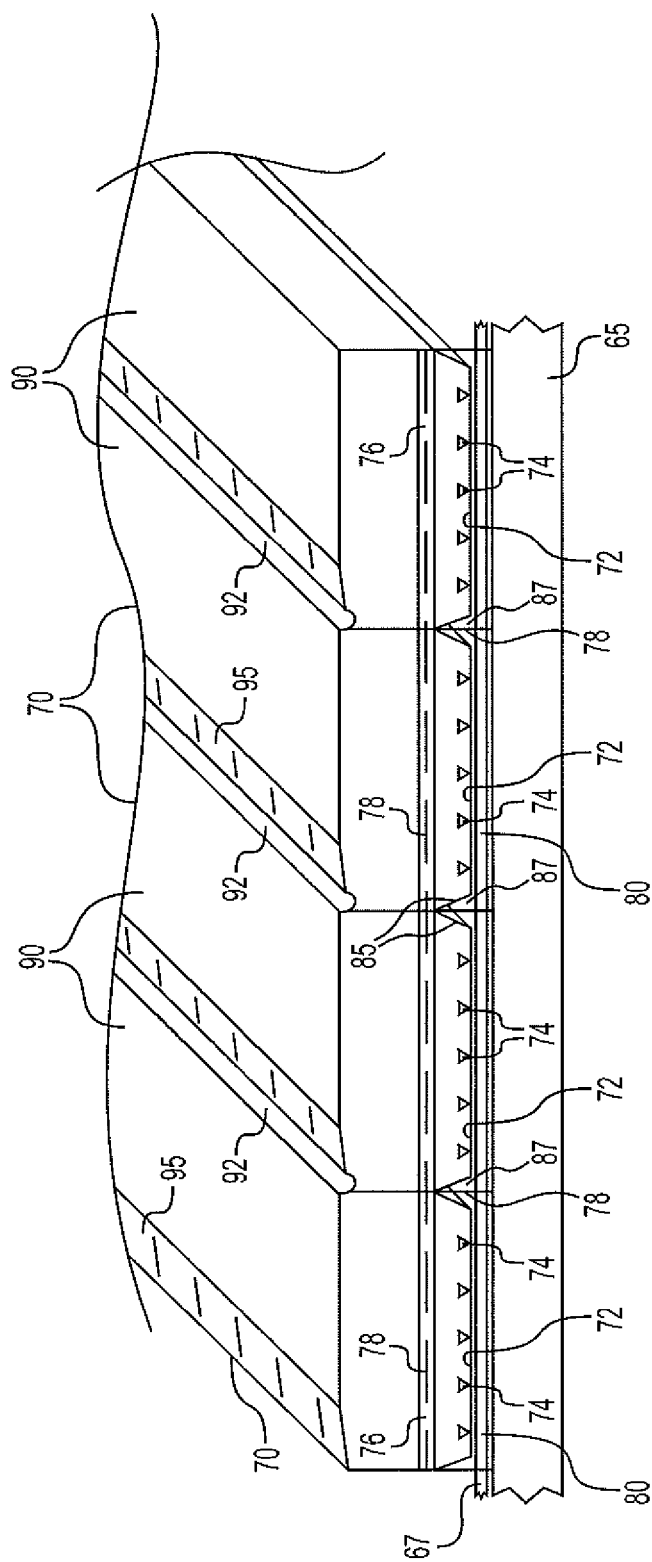
FIG. 3 is a side, perspective, cross-sectional view of a support pad assembly.

One extra element of bonding the lignum vitae blocks onto the fiber mat is a set of holes drilled or grooves cut into the bottom surface of the lignum vitae blocks upwardly into those wood blocks. Preferably those holes/grooves are drilled up to approximately halfway into the thickness of the wood blocks. Shorter and deeper holes/grooves could likewise be used. The holes/grooves are filled with epoxy to form an epoxy nail embedded in and anchored on the mat. The holes/grooves can have curves as shown. The holes/grooves can be any shape of aperture to enable the epoxy to flow into it to form an extra bond material. The holes/grooves are shown in FIG. 3 as being substantially perpendicular to the bottom surface of the blocks. Angled or curved apertures are also possible.

Another element of bonding of the blocks to the fiber mat is the use of fiber thread clamps. A hole or holes are drilled across the width of a lignum vitae block with an opening on each side of the block. The hole passage is contained within the thickness of the lignum vitae block. For example, as shown in FIG. 3, this passage is positioned about mid-way in the height of the lignum vitae block. Carbon fibers or threads are inserted through the holes. These carbon fibers or threads, also referred to as fiber thread clamps, extend out on both sides of the lignum vitae block and down onto the fiber mat. These fiber thread clamps are then bonded to the mat with the epoxy during the bonding step. Other fibers or threads may be used as long as they display excellent strength and small size. In addition to there being one or more holes across the width of each block, there may be one or more fiber threads that are fit through each hole and anchored in the underlying mat during bonding.

Another bonding element that is possible in securing the lignum vitae blocks to the carbon fiber mat on the support pad includes the use of lignum vitae blocks having sidewalls that intentionally form gaps between the adjacent lignum vitae blocks. The edge of the blocks defined by the sidewalls and the bottom surface of the blocks are not perpendicular, but instead allow for a space between the blocks. This gap is not intended to be present on the top side or wear surface of the lignum vitae blocks, because it is desired that the material is available to the wear surface that does not include an exposure to epoxy. For example, as shown in FIG. 3, this gap between adjacent blocks extends up as far as about halfway of the thickness of the lignum vitae blocks.

Turning now to FIG. 3 as an example, there is shown a cross-section of lignum vitae wood blocks 70 mounted onto a support plate 65. The support plate 65 is a monolithic piece of steel or aluminum onto which the blocks 70 are mounted. Fixed to the top of the plate 65 is a fiber mat 67. The fiber could be any natural or synthetic fiber-based material, but in this example is a carbon fiber mat. The mat 67 is in turn secured to the bottom surface 72 of the blocks 70. The bottom surface 72 has holes 74 drilled therein. The side walls of the blocks 70 have angled portions 85 that form open grooves 87 between the blocks. Both the holes 74 and the grooves 87 may be filled with an adhesive, for instance an epoxy, that is used to secure the blocks 70 to the mat 67 and then in turn to the plate 65. This attachment is reinforced by creating passageways 76 across the width of the blocks 70 and is open on each end. A thread 78 passes through the passageways 76 and then extends vertically down to the mat 67 where it is also adhered to the mat and the plate 65.

The top surface 90 of the blocks 70 includes a leading edge 95 with a water port 92 to facilitate water flow across the top of the wear surface. Additionally, the top surface 90 includes the beveled or chamfered leading edge 95.

The wear pad is an assembly of multiple lignum vitae blocks. These lignum vitae blocks may be different shapes such as square, rectangular, triangular, or otherwise. As shown, the blocks are relatively rectangular, although one end is wider than the other with the inside and closest to the inside diameter end of the wear pad being more narrow than the outside end. The approximate length and width of these lignum vitae blocks may range from about one inch by one inch to about eight inches by twelve inches. The thickness of these blocks may also vary between one half to six inches, or alternatively one to two inches, or approximately one inch. As shown in FIG. 4, the lignum vitae blocks are mounted in end grain orientation wherein the wear pad surface is substantially perpendicular to the direction of the natural grain of the lignum vitae wood blocks. The wood blocks 110 are shown as center cut or heart sections of the lignum vitae wood. Alternatively, the blocks may be mounted in a side, also known as long-grain orientation where the plane of the wear surface is substantially parallel to the natural grain of the wood blocks. In this example as shown in FIG. 5, the wood grain may be oriented perpendicular to the direction of the thrust flange rotation or parallel to that direction, or some angle in between. Likewise, the grain may be some other orientation with respect to the surface of the wear pad.

The lignum vitae wood described herein is from the *Guaiacum* genus of trees. This includes both the *Guaiacum officinale* and *Guaiacum sanctum* species. Lignum vitae wood is believed to be the densest wood that is reasonably available in that it will easily sink in water and has a Janka scale hardness of about 4,500. An additional benefit of using lignum vitae wood blocks is the inherent presence of the *guaiacum* resin that exists in the natural lignum vitae wood. The presence of the *guaiacum* resin results in the existence of mixed modes of lubrication of the wood blocks. As described herein, there is a water lubrication of the wood bearing faces, however there is also the presence of the *guaiacum* resin as a lubricant on the face of the wood blocks. As a result, there are the mixed modes of water and resin lubrication of the wood block surfaces.

As shown especially in FIG. 3, each lignum vitae block has top edges defined by the intersection of the side walls and the top side or wear surface of the lignum vitae blocks. These top edges 95 as shown in FIG. 3 are shown as being chamfered or rounded to reduce edge loading on the blocks, especially when the thrust flange begins to rotate on the wear pad. The top edges of each lignum vitae block may be chamfered around the entire top edge perimeter of each block. The top edge may be chamfered only partially around the top edge perimeter. The degree of chamfer may be about one to six degrees and may have a width of about $1/16^{th}$ to $3/4$ of an inch. In one example, each block is only chamfered along the side of each block that is the leading edge as oriented with the rotation of the thrust flange across the wear pad surface. Also, the degree of chamfer may vary across the block. For instance, a number of wedges of the collection of lignum vitae blocks may be mounted onto the support plate. There are gaps between each wedge of lignum vitae blocks. The leading edge of each wedge of blocks may be more substantially chamfered (larger radius) as compared with the leading edge of the blocks that are internal within the wedge section.

As also shown in FIG. 4, the multiple blocks of lignum vitae are heart sections of the wood. These heart sections are believed to be the hardest and most durable sections of the wood under the stress of the thrust flange and shaft.

In traditional thrust bearings and wear pads, the wear pad surface is lubricated with a sophisticated hydrocarbon-based lubricant. In the present construction, the lubricant is mostly or all water. The thrust flange is carried by a thin film layer of water. This water lubricant is provided to the surface of the wear pad through water ports spaced around the wear pad as shown. The water is pumped to the surface using pumps having the capacity to keep the bearing saturated. And, as explained earlier, when using lignum vitae wood, there is actually a mixed media of lubricant with at least the water and the *guaiacum* resin naturally in the wood.

The entire thrust flange/wear pad/collar area of a hydro system is encased in a sealed box. This seal will include a seal around the shaft below the flange and a second seal around the shaft above the flange and will encircle the entire flange. Inside this sealed box is water that is used as the lubricant with the lignum vitae wear pad system. Alternatively, the fluid may include a certain fraction of *guaiacum* resin mixed in with the water. The *guaiacum* resin is the natural resin product of lignum vitae wood. The resin may benefit the lubricating properties of the lignum vitae wear pads by protecting both the wood and the thrust flange wear surface. The amount of *guaiacum* resin that could be incorporated in this sealed box would be approximately 2% to 10%, or alternatively about 5% to 8% of the *guaiacum* resin.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A thrust bearing wear pad comprising:
a rigid support plate adapted to be mounted on a collar and under a thrust flange; and
a plurality of lignum vitae blocks fixed to the support plate and forming a wear pad surface thereon,
and wherein the lignum vitae blocks comprise heart sections of lignum vitae wood.

2. The A thrust bearing wear pad as described in claim 1, wherein the thickness of the lignum vitae blocks is at least one inch.

3. The A thrust bearing wear pad as described in claim 1, wherein the lignum vitae blocks comprise a top side that forms the wear pad surface, a bottom side that is fixed to the support pad, side walls that extend from the top side and the bottom side, and top edges that define the intersection of the side walls and the top side; further wherein the top edges are chamfered whereby edge loading is reduced.

4. A thrust bearing wear pad comprising:
a rigid support plate adapted to be mounted on a collar and under a thrust flange; and
a plurality of lignum vitae blocks fixed to the support plate and forming a wear pad surface thereon, and
wherein the lignum vitae blocks are configured adjacent to each other and are each bonded onto a carbon fiber mat that is itself bonded to the support plate.

5. The A thrust bearing wear pad as described in claim 4, wherein each lignum vitae block has at least one hole drilled into and across an entire width of the block and within the thickness of the block;
further comprising a fiber thread clamp extending through the hole and having a fiber length sufficient that opposite ends of the fiber thread extend out of each side of the lignum vitae blocks and down to the carbon fiber mat and that are bonded to the mat.

6. The thrust bearing wear pad as described in claim 5, wherein the carbon fiber mat is bonded to the lignum vitae blocks with epoxy, and the fiber thread ends are bonded to the fiber mat with epoxy.

7. The thrust bearing wear pad as described in claim 6, wherein the lignum vitae blocks comprise a top side that forms the wear pad surface, and a bottom side that is bonded to the carbon fiber mat and thereby to the support plate;
the lignum vitae blocks further comprising vertical holes therein that are open on the bottom side and that extend into the thickness of the blocks;
and wherein the epoxy fills in the vertical holes to reinforce the bond of the lignum vitae blocks to the carbon fiber mat.

8. The A thrust bearing wear pad as described in claim 7, wherein the vertical holes extend up to about half of the thickness of the lignum vitae blocks.

9. A thrust bearing wear pad comprising:
a rigid support plate adapted to be mounted on a collar and under a thrust flange; and
a plurality of lignum vitae blocks fixed to the support plate and forming a wear pad surface thereon, and
wherein the wear pad further comprises water ports open to the wear pad surface to enable the flow of water across the surface.

10. A thrust bearing wear pad as described in claim 1, comprising:
a rigid support plate adapted to be mounted on a collar and under a thrust flange; and
a plurality of lignum vitae blocks fixed to the support plate and forming a wear pad surface thereon, and
wherein the lignum vitae blocks are arranged so that the plane of the wear pad surface is substantially perpendicular to the natural grain of the lignum vitae blocks.

11. A thrust bearing wear pad comprising:
a rigid support plate adapted to be mounted on a collar and under a thrust flange; and
a plurality of lignum vitae blocks fixed to the support plate and forming a wear pad surface thereon, and
wherein the lignum vitae blocks are arranged so that the plane of the wear pad surface is substantially parallel to the natural grain of the lignum vitae blocks.

* * * * *